UNITED STATES PATENT OFFICE.

ERNEST E. WERNER, OF ST. LOUIS, MISSOURI.

STOCK FOOD AND METHOD OF TREATING SAME.

1,201,663.         Specification of Letters Patent.      Patented Oct. 17, 1916.

No Drawing.     Application filed December 20, 1915. Serial No. 67,754.

*To all whom it may concern:*

Be it known that I, ERNEST E. WERNER, a citizen of the United States, residing in the city of St. Louis and State of Missouri, have invented new and useful Improvements in Stock Foods and Methods of Treating Same, of which the following is a specification.

This invention relates to stock foods, and to a novel method of preparing the same to secure and maintain a desirable color in the finished product.

It is the main object of the invention in the production of a stock food containing alfalfa or other grass or hay, to insure that the product shall have or retain substantially the natural green color of the alfalfa or hay.

In the manufacture of stock foods the color factor of the finished product is an important item. Such foods, usually composed of alfalfa or other grass or hay, mixed with corn and oats, or other cereals, either with or without molasses, should have a color approximating the natural green of the principal ingredient, such as alfalfa. Alfalfa, or other grass, which has been cured in the field and exposed somewhat to the influence of weather, fermentation or age, tends to turn to a brownish color, and when combined with ordinary molasses the brownish color is deepened, and the greenish tinge is consequently destroyed or greatly depreciated. This depreciation in color is due not only to the brown tinge imparted by the molasses, but also to the fact that the normal increase in acidity of the product, due to aging, as well as the acidity factor of the molasses, has a detrimental effect upon the coloring matter of vegetable green.

I have found by experiment that the addition of a very small quantity of an alkaline substance to such primarily green vegetable matter as is commonly used in the manufacture of commercial stock foods has a very material effect in preventing the impairment or destruction of the greenish tinge which should characterize the ultimate product. Thus, alfalfa, which in the course of aging and transportation, has become decidedly yellowish brown in tint, can be restored to a bright and attractive green by the addition of from one-tenth to one-fifth per cent. by weight of a suitable alkaline substance. In the application of this discovery to the manufacture of a commercial stock food, I find, for example, that if to a mixture of, say, 1000 pounds of alfalfa, 300 pounds of corn, 200 pounds of oats and 500 pounds of molasses, an addition be made of from 3 to 4 pounds of sodium bicarbonate, the color of the finished product will be materially improved over what it would have been if the alkali had not been added, and will appear as a natural bright green, which tends to enhance with age, resembling in every way the color of freshly cut alfalfa, and will maintain this appearance long after the same product, untreated, would have taken on a dark brown color.

The addition of the alkaline substance may be made either by first dissolving the same in a small quantity of water and spraying it on the grass, or by mixing the solution with the grass; or the alkaline substance may be introduced during the operation of mixing the feed in dry form, the moisture content of the molasses being depended upon to dissolve it, and in either case the beneficial improvement in color above described is produced and maintained.

I have further found by investigation that the normal acidity factor of the finished product remains fairly constant after the addition of the alkali. For example, a quantity of feed prepared according to the above formula showing an initial acidity, expressed as lactic acid, of .70 untreated and .50 after treatment, showed, after a lapse of three months of aging, an acidity of .90 and .40, respectively.

As a collateral advantage I find that the addition of an alkali materially improves the keeping qualities of a stock food of the above description, and retards fermentative changes.

It will be understood, of course, that the above formula is merely given by way of illustration, and that the invention is applicable to any vegetable stock food in which the principal ingredient is alfalfa or other grass, or hay, or similar substance, containing naturally a vegetable green, and the color of which is destroyed or depreciated by curing or during the course of manufacture as above outlined.

The term "grass" as used in the claims is intended to have a generic significance and to cover grasses popularly so-called as well as leguminous plants, such as lucerne or alfalfa, and whether the same be freshly cut or in the dry state, commonly known as "hay."

I claim:

1. The method of retaining the green color in a stock food, composed in part of a substance in its natural condition and containing vegetable green, which consists in permanently incorporating in the stock food a harmless alkaline substance in the presence of moisture and during and after such admixture maintaining such substance in its natural, or raw state.

2. The method of retaining the green color in a stock food, composed in part of a substance in its natural condition and containing vegetable green, and mixed with other substances tending to impair or destroy the greenish color, which consists in permanently combining with the product a harmless alkaline substance in the presence of moisture, and during and after such admixture maintaining such substance in its natural, or raw state.

3. In the art of preparing stock foods containing grass, the method of retaining in the finished product the natural green color of the grass which consists in permanently combining with the product an alkaline substance in the presence of moisture, and during and after such admixture maintaining the grass in its natural, or raw state.

4. In the art of preparing stock foods containing grass, the method of retaining in the finished product the natural green color of the grass, which consists in modifying the acid content of the product and during and after such treatment maintaining the grass in its natural, or raw state.

5. The method of retaining the natural greenish color of alfalfa or other grass, which consists in permanently combining a harmless alkaline substance therewith and during and after such admixture maintaining the grass in its natural, or raw state.

6. The method of restoring the natural greenish color of alfalfa or other grass, which consists in permanently combining a harmless alkaline substance therewith and during and after such admixture maintaining the grass in its natural, or raw state.

7. As a new article of manufacture, a stock food having as one of its ingredients a grass in its natural, or raw state, and containing vegetable green and having permanently combined therewith a harmless alkaline substance.

8. As a new article of manufacture, a stock food having as an ingredient a grass in its natural, or raw state, and containing vegetable green and having combined therewith a harmless alkaline substance in sufficient quantity to modify the action of the acid content of the product upon the vegetable green of the grass.

In testimony whereof, I have hereunto set my hand.

ERNEST E. WERNER.

Copies of this patent may be obtained for five cents each, by addressing the "Commissioner of Patents, Washington, D. C."